United States Patent
Loritz

(10) Patent No.: US 7,051,871 B2
(45) Date of Patent: May 30, 2006

(54) OPTICAL DISK CONTAINERS

(75) Inventor: Kenneth A. Loritz, Yorba Linda, CA (US)

(73) Assignee: Loritz & Associates, D.B.A. L&A Plastic Molding & Tooling, Yorba Linda, CA (US)

(*) Notice: Subject to any disclaimer, the term of this patent is extended or adjusted under 35 U.S.C. 154(b) by 126 days.

(21) Appl. No.: 10/272,158

(22) Filed: Oct. 15, 2002

(65) Prior Publication Data

US 2003/0085139 A1    May 8, 2003

Related U.S. Application Data

(60) Provisional application No. 60/330,223, filed on Oct. 16, 2001.

(51) Int. Cl.
B65D 85/57    (2006.01)

(52) U.S. Cl. ............ 206/308.1; 206/303; 206/309; 206/509

(58) Field of Classification Search ............ 206/308.1, 206/307.1, 307, 509, 309–313, 303, 445, 206/454–456, 505–507, 1.5, 459.5; 220/4.26, 220/4.27; 40/641, 306, 340; 211/40, 41.12
See application file for complete search history.

(56) References Cited

U.S. PATENT DOCUMENTS

| | | | |
|---|---|---|---|
| 3,552,548 A * | 1/1971 | Wallestad et al. ............ 206/710 |
| 4,144,968 A * | 3/1979 | Shelton ...................... 206/509 |
| 4,292,657 A * | 9/1981 | Iwan et al. ............... 360/98.02 |
| 4,407,426 A * | 10/1983 | McLaren et al. ........... 206/508 |
| 4,508,366 A | 4/1985 | Brindle ........................ 281/36 |
| 4,518,275 A | 5/1985 | Rauch, III et al. ......... 402/80 P |
| 4,609,105 A | 9/1986 | Manes et al. ............. 206/308.3 |
| 4,619,363 A | 10/1986 | Wolfseder |
| 4,747,484 A | 5/1988 | Ackeret ...................... 206/309 |
| 4,874,085 A | 10/1989 | Grobecker et al. ...... 206/308.1 |
| 5,062,539 A | 11/1991 | Chandler |
| 5,180,058 A | 1/1993 | Hu .......................... 206/308.1 |
| 5,293,992 A | 3/1994 | Warner .................... 206/308.1 |
| 5,385,326 A | 1/1995 | Bidwell |
| 5,425,450 A | 6/1995 | Lin ............................ 206/310 |
| 5,469,961 A | 11/1995 | Chang ........................ 206/312 |
| 5,476,173 A | 12/1995 | Opresco .................... 206/309 |
| 5,501,540 A | 3/1996 | Ho ............................... 402/73 |
| 5,518,112 A | 5/1996 | Ono et al. ............... 206/308.3 |
| 5,547,078 A | 8/1996 | Iida .......................... 206/308.1 |
| 5,620,271 A | 4/1997 | Bergh et al. .................. 402/79 |
| 5,634,559 A | 6/1997 | Foos et al. .................. 206/518 |
| 5,667,094 A * | 9/1997 | Rapchak et al. ............ 220/834 |

(Continued)

FOREIGN PATENT DOCUMENTS

EP    0 568 328 A2    3/1993

(Continued)

*Primary Examiner*—Mickey Yu
*Assistant Examiner*—J. Gregory Pickett
(74) *Attorney, Agent, or Firm*—Knobbe, Martens, Olson & Bear, LLP

(57) ABSTRACT

The present invention relates generally to plastic containers which can be used for holding, organizing and securing optical disks including CDs, DVDs, mini CDs, and mini DVDs. Features of the apparatus serve to prevent dirt, dust, water, and other debris from entering the containers. Additional features include a stackable design that aids in organization and storage of a plurality of optical disks or other items. Some embodiments of the present invention have a hinged top and bottom. Additional features of some embodiments include ears allowing the container to be attached to a travel device such as a notebook or binder.

1 Claim, 15 Drawing Sheets

U.S. PATENT DOCUMENTS

| | | | |
|---|---|---|---|
| D387,217 S | 12/1997 | Lakoski et al. | D6/407 |
| 5,699,925 A * | 12/1997 | Petruzzi | 220/4.27 |
| 5,713,463 A | 2/1998 | Lakoski et al. | 206/308.1 |
| 5,829,583 A * | 11/1998 | VerWeyst et al. | 206/308.1 |
| 5,848,689 A | 12/1998 | Mueller | 206/308.1 |
| 5,950,822 A | 9/1999 | Cloran et al. | 206/310 |
| 6,021,894 A * | 2/2000 | Lakoski et al. | 206/308.1 |
| 6,050,404 A | 4/2000 | Lee | 206/308.1 |
| 6,092,652 A * | 7/2000 | Evans | 206/308.1 |
| 6,155,417 A | 12/2000 | Flores, Jr. et al. | 206/308.1 |
| 6,170,658 B1 * | 1/2001 | Dering | 206/308.1 |
| 6,179,120 B1 | 1/2001 | Chou | 206/308.1 |
| 6,188,032 B1 | 2/2001 | Hartman | 206/308.1 |
| 6,302,288 B1 * | 10/2001 | Nava et al. | 206/308.1 |
| 6,371,300 B1 | 4/2002 | Uchida | 206/751 |
| 6,382,414 B1 * | 5/2002 | Chang | 206/308.1 |
| 6,386,361 B1 | 5/2002 | Ting | 206/308.1 |
| 6,394,266 B1 | 5/2002 | Chou | 206/308.1 |
| 6,454,090 B1 | 9/2002 | Flores, Jr. et al. | 206/308.1 |
| 6,454,091 B1 | 9/2002 | Mendoza et al. | 206/308.1 |
| 6,464,073 B1 | 10/2002 | Tang | 206/310 |
| 6,467,616 B1 | 10/2002 | Hegarty et al. | 206/308.1 |
| 6,523,683 B1 * | 2/2003 | Fraser et al. | 206/308.1 |
| 6,568,526 B1 * | 5/2003 | Reinhardt et al. | 206/310 |
| 6,749,061 B1 * | 6/2004 | Clausen | 206/308.1 |

FOREIGN PATENT DOCUMENTS

FR    2670713 A1 *  6/1992

* cited by examiner

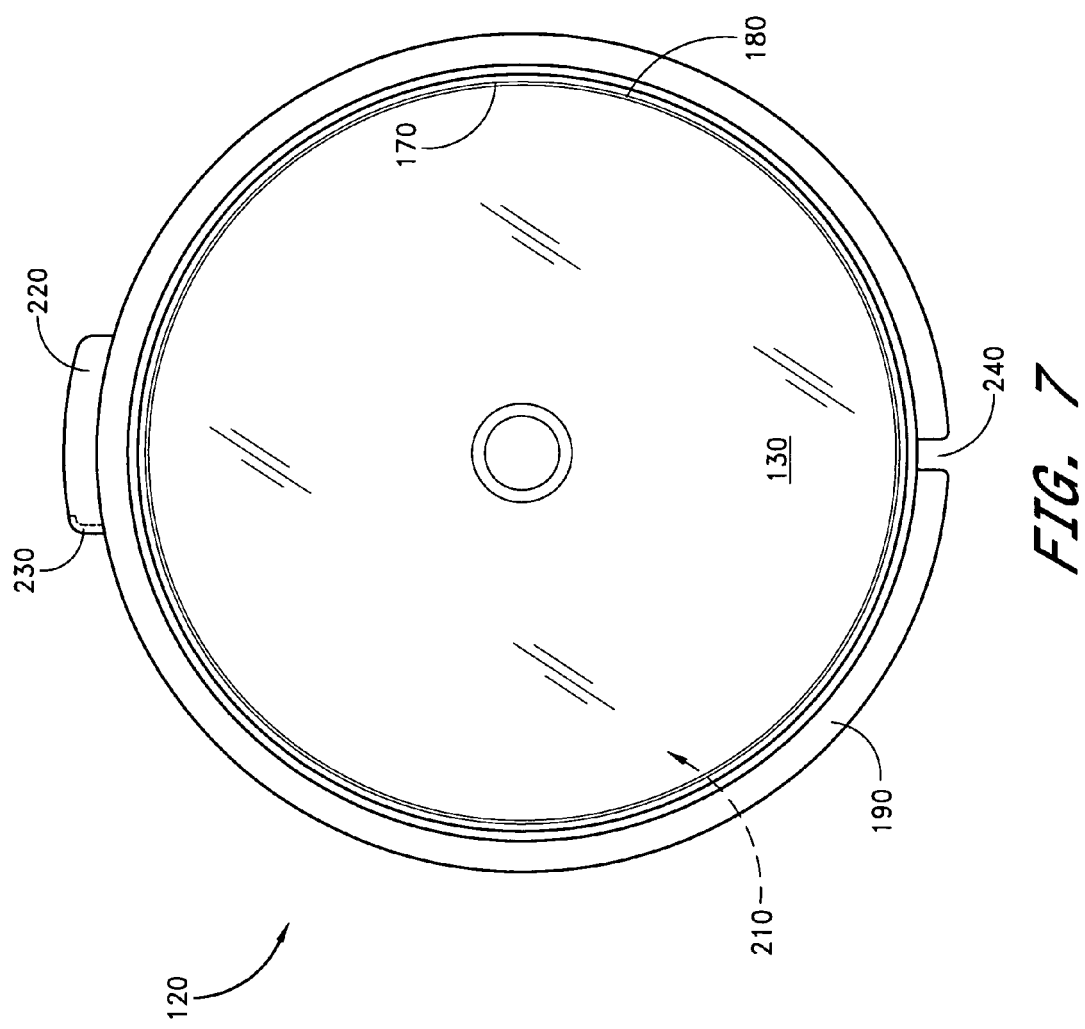

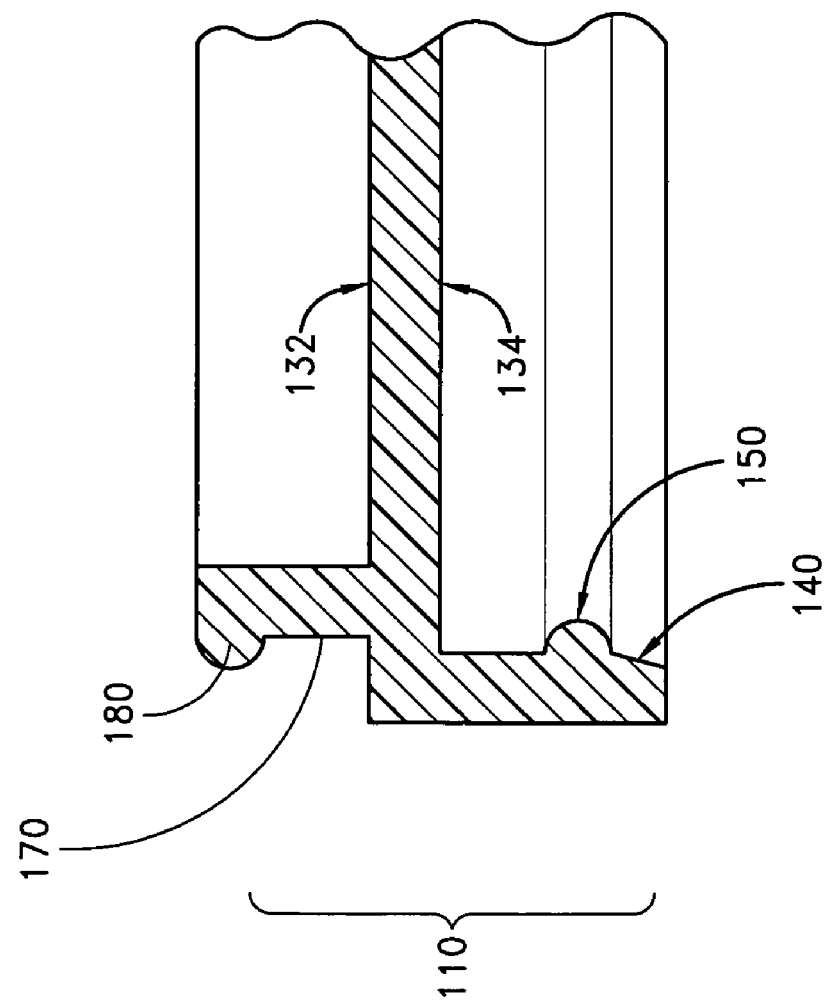

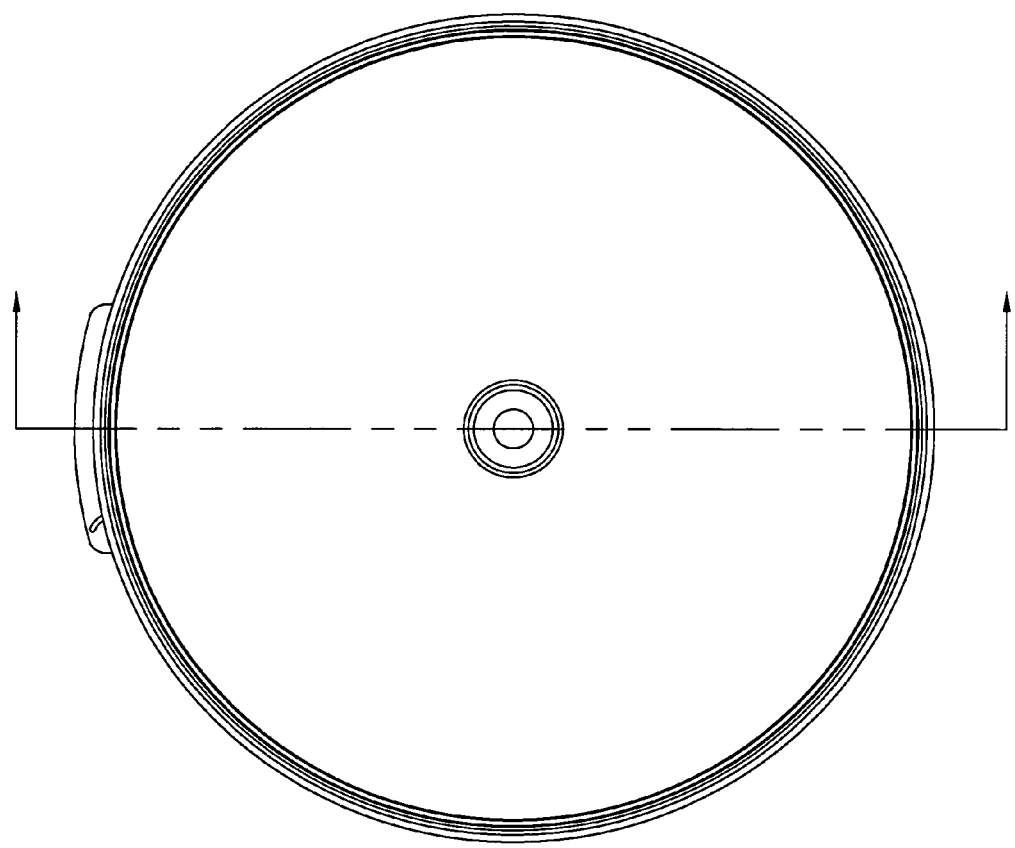
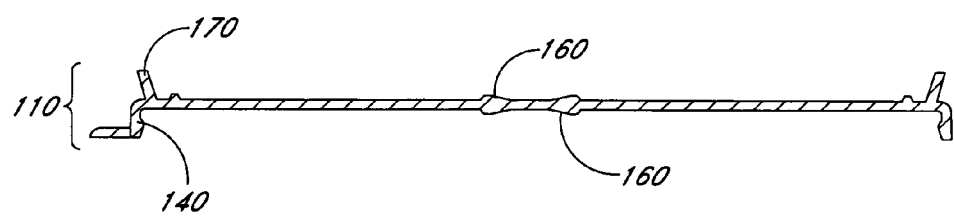
FIG. 12

OPTICAL DISK CONTAINERS

PRIORITY CLAIM

This application claims the benefit of U.S. Provisional Application No. 60/330,223 filed Oct. 16, 2001 entitled "Stackable Plastic Containers," the entire contents of which is hereby expressly incorporated by reference.

BACKGROUND OF THE INVENTION

1. Field of the Invention

The present invention relates generally to plastic containers for holding, organizing and securing optical disks.

2. Description of the Related Art

Stackable containers have long been used in the prior art. Typically, containers with stackable properties use threaded male/female sections. The top female section is constructed with internal threads. This section screws into the male bottom section. The male bottom section is constructed with an additional attached molded female section which is also a container. Several such containers can be combined to form a stack of containers. These types of threaded containers are generally more expensive and much slower to manufacture than "snap-together" containers. Because threaded containers also allow dirt and debris in the threads, threaded containers often have difficulty closing properly. Further, threaded containers are frequently much taller in height due to the minimum amount of threads needed to make the container screw together. Indeed, most threaded containers are at least about 0.375 inches high. Threaded containers also require stiffer plastic and thicker side walls because of the threaded side wall pressures. Soft plastics like polypropylene are typically not suitable for threaded containers because the threads may strip if over-tightened.

Other containers that use stacking properties are found in the houseware industry. A houseware stackable containers have covers with ribs that match the bottoms of matching containers. The raised rib around the perimeter of a container's lid is larger than the bottom of the container to be stacked on the cover. The bottom nests into the lid. This container relies on gravity and internal weight to stay together. If the containers are dropped, the stack of containers simply falls apart.

Other containers in the prior art use a "friction fit" lid and bottom. This type of container has a lid which has a raised center section approximately 0.050 inches per side smaller than the outside diameter of the container. This area is raised 0.030 inches to 0.050 inches from the rest of the lid. The bottom of the container which forms the container has a ring a few thousands smaller than the top raised center section. The bottom will fit so that the friction that is created will hold the next container set next to the previous container set. Typically, a container set is made of one top and one bottom. A stack is made up of two or more container sets stacked on each other. This method of stacking containers is expensive because of the extra parts required to manufacture the container.

SUMMARY OF THE INVENTION

In one aspect, the current invention provides an improved plastic container for holding, organizing and/or securing optical disks, or like contents, that is easy and inexpensive to manufacture and which can be used as a single disk holder or in stackable format, in which an internal cavity is formed by a male/female (top and bottom) container. Preferably, each container is only as thick as the required thickness of the item to be enclosed, such as, for example, an optical disk. The containers may be secured by closing, locking, and/or sealing mechanisms. In a preferred embodiment, the material used for the containers is plastic, preferably polypropylene. The plastic may be tinted or colored with translucent or opaque color additives. In various aspects, the invention has a tab molded onto the side wall to allow easy identification and retrieval of the desired container. The tab may be labeled with a number or a letter which corresponds to a label table on the lid. In several embodiments, the current invention has an opening function which allows the user to pry apart two tabs with both thumbs. In one aspect of the invention, the inside center of the female side has a raised positioning ring which holds and centers the contents in the cavity formed by a male/female junction. By holding the contents in position, this ring prevents the contents from rubbing on the inside of the container Various embodiments of the present invention provide stackable plastic containers which can be used for holding, organizing and/or securing optical disks. Optical disks, as used herein, shall mean digital and electronic data storage units, including, but not limited to CDs, DVDs, mini CDs, mini DVDs, floppy discs, computer, audio, video and digital camera discs, and the like. Methods of manufacturing and constructing these containers are also provided. Single non-stackable sealed plastic containers may also be made according to various aspects of the current invention. Some embodiments include ears designed to fit in different notebooks, three-ring binders, or day timers.

Several embodiments of the current invention are particularly advantageous because they offer light weight non-toxic containers which can be effectively be stacked upon one another and are capable of being latched or closed, thus creating a seal which keeps foreign material from entering the container. Thus, in a preferred embodiment, the current invention is particularly advantageous because it prevents dirt or foreign material from entering the container. A single non-stackable moisture/dirt sealed container can also be made using portions of the same design criteria, i.e. top female, bottom male sections.

In one aspect of the present invention, an apparatus for stackably storing items, including a first container, a surface included in the first container, the surface substantially planar, the surface having a first side and a second side, the surface having a shape suited to cover at least one item, a first member included in the first container, the first member raised from the first side of the surface, the first member having a first member perimeter, a second member included in the first container, the second member raised from the second side of the surface, the second member having a second member perimeter slightly larger than the first member perimeter, the second member suited to releaseably couple the first container to a first member of a substantially identical second container, wherein the first member forms a substantially complete perimeter around the first side of the surface, and, wherein the second member forms a substantially complete perimeter around the second side of the surface.

In one aspect of the invention, the first member forms a substantially complete ring around the first side of the surface. In another aspect of the invention, the second member forms a substantially complete ring around the second side of the surface. In another aspect of the invention, the second member includes a bead along the inside perimeter, the bead locking the first member of the second container to the second member of the first container and holding the first container and second container together. In another aspect of the invention, the bead is about 0.020 inches in radius.

Yet another aspect of the invention includes a tab extending from the surface of the first container, the tab suited to releaseably decouple the first container from the second container. In another aspect of the invention, includes a tang extending from the surface of the first container, the tang suited to prevent the tab of the first container from sliding past a tab of the second container. In another aspect of the invention, the first container is formed from plastic. In another aspect of the invention, the first container is formed from polypropylene. In another aspect of the invention, the first container is formed from clear plastic. In another aspect of the invention, the first container is formed from plastic opaque to visible light. In another aspect of the invention, the first container is formed from plastic opaque to ultraviolet light. In another aspect of the invention, the first container is formed from translucent plastic. In another aspect of the invention, the item stored is at least one of a compact disc or digital versatile disc or other optical disk. In another aspect of the invention, including a third container, the third container including a surface and first member substantially identical to the first container. In another aspect of the invention, a label attached to the second side of the third container. In another aspect of the invention, a tab extending from the surface of the first container, the tab suited to releaseably decouple the first container from the second container. In another aspect of the invention, a tang extending from the surface of the first container, the tang suited to prevent the tab of the first container from sliding past a tab of the second container. In another aspect of the invention, a fourth container, the fourth container including a surface and a second member substantially identical to the first container. In another aspect of the invention, a label attached to the first side of the fourth container. In another aspect of the invention, a tab extending from the surface of the first container, the tab suited to releaseably decouple the first container from the second container. In another aspect of the invention, a tang extending from the surface of the first container, the tang suited to prevent the tab of the first container from sliding past a tab of the second container. In another aspect of the invention, the height of the first member is slightly higher than the height of the item to be held by the container. In another aspect of the invention, the height of the first member is between about 0.010 inches and 0.125 inches. In another aspect of the invention, the surface of the first member is round. In another aspect of the invention, the width of the surface of the first container has an area slightly larger than the item to be held by the container. In another aspect of the invention, the width of the surface of the first container is between about 0.5 inches and 12 inches. In another aspect of the invention, the width of the surface of the first container is about 6 inches. In another aspect of the invention, the surface of the first member is rectangular.

Another aspect of the present invention includes a positioning ring, the positioning ring raised on the center of the second side of the surface of the first container, the positioning ring formed to hold the contents in the cavity formed by the second member of the first container and the first surface of the second container. In another aspect of the invention, a second positioning ring is included in the center of the second side of the second container. In another aspect of the invention, the positioning ring has a diameter ranging from about 0.5 inches to 0.6 inches. In another aspect of the invention, the positioning ring is raised from the second side of the surface of the first container to a height of about 0.010 inches to 0.300 inches. In another aspect of the invention, the substantially planar surface includes a slight curvature to protect the item from contact with the substantially planar surface. In another aspect of the invention, the substantially planar surface includes a slight curvature to protect the item from contact with the substantially planar surface. In another aspect of the invention, the first member is tapered such that a portion of the first member in contact with the substantially planar surface is thinner than a portion of the first member furthest from the planar surface. In another aspect of the invention, an outer edge of the first member forms an angle with the planar surface that is less than 90 degrees. In another aspect of the invention, the first member is substantially normal to the planar surface. In another aspect of the invention, the second member is substantially normal to the planar surface.

Another aspect of the present invention includes an apparatus for stackably storing items, comprising a first container, the container including a generally planar surface having a first side and a second side, a first member forming a generally complete perimeter generally normal to and around the first side of the generally planar surface, a second member forming a generally complete perimeter generally normal to and around the second side of the generally planar surface, the second member including a bead, and, a releasable coupling between the first container and a substantially identical second container, the coupling formed by the second member of the first container and the first member of the second container. Several embodiments of the invention further include a positioning ring, the positioning ring raised on the center of the second side of the surface of the first container, the positioning ring formed to hold the contents in the cavity formed by the second member of the first container and the first surface of the second container.

Another aspect of the invention includes an apparatus for stackably storing items, including a container means, the container means including a substantially planar surface with a first and second side, releaseable coupling means, the releaseable coupling means including a first member attached to the first side of the substantially planar surface and a second member attached to the second side of the substantially planar surface, and, an item fixing means, the item fixing means including a positioning ring to releaseably couple the item to the container. In another aspect of the invention, the first member forms a substantially complete perimeter around the substantially planar surface. In another aspect of the invention, the second member forms a substantially complete perimeter around the substantially planar surface. In another aspect of the invention, the second member includes bead means to seal the releasable coupling between a first container and a second container.

Yet another aspect of the invention includes an apparatus for storing items, where a first piece and a second piece where said first and second pieces are substantially planar and said first and second pieces each have a first and second surface, the first piece having at least one wall at or near its perimeter extending away from at least one of said surfaces, the second piece having at least one wall at or near its perimeter extending away from at least one of said surfaces, the at least one wall of the first piece and the at least one wall of the second piece are removeably joinable such that said first and second pieces and said walls form a container. In another aspect of the present invention the first and second pieces are attached by a hinge.

In another aspect of the present invention, the first piece forms a top of the container and the second piece forms a bottom of the container and the top piece includes at least one positioning member for orienting an item to be contained in the container. In another aspect of the present invention the bottom contains at least one positioning member for orienting an item to be contained in the container. In another aspect of the present invention, the bottom contains at least one positioning member for orienting an item to be contained in the container. In another aspect of the present invention, the container is substantially round, said first piece forms a bottom and said second piece forms a top, said bottom piece having a center positioning member and a perimeter positioning member. In another aspect of the present invention, the top piece has a center positioning member. In another aspect of the present invention, the top piece has a perimeter positioning member. In another aspect of the present invention, the top piece has a perimeter positioning member.

Another aspect of the present invention includes an apparatus for storing items, including a substantially planar and substantially round first piece with a diameter of approximately between about 3.0 inches to about 5.5 inches, a first wall extending laterally from said first piece a distance of approximately between about 0.06 inches to 0.12 inches, a second piece that is substantially planar and substantially round with a diameter of approximately between 3.0 inches to about 5.5 inches, a second wall extending laterally from said second piece a distance of approximately about 0.06 inches to about 0.12 inches, with a positioning ring in the center of each of the first and second piece, where said positioning rings are raised from a surface of each of said pieces approximately between about 0.01 inches to 0.12 inches, said positioning rings having diameters of approximately about 0.20 inch to about 0.62 inches, where said first piece has a stabilizing ring raised from the surface with a diameter approximately between about 2.5 inches and about 5 inches. In another aspect of the present invention the second piece has a stabilizing ring on the surface with a diameter approximately between about 2.5 inches and about 5 inches. In another aspect of the present invention, the container is designed to hold an optical disk and to prevent dust, dirt, moisture, and other debris from reaching said disk.

In other embodiments, an apparatus is disclosed for individually storing for easy retrieval a plurality of items in respective individual indexed nestable containers which are each substantially sealed against intrusion of foreign material into the container, the containers adapted to form a generally cylindrical stack which resists coming apart unless and until entry of one or more containers is desired, the apparatus having a plurality of mating container members, each of the members having a substantially planar surface having a first side and a second side, a first substantially circular peripheral enclosure upstanding from the first side, a second substantially circular peripheral enclosure upstanding from the second side, the inner perimeter of the second peripheral enclosure being sufficiently larger than the outer perimeter of the first peripheral enclosure so that the second peripheral enclosure fits over and grips the first peripheral enclosure of another one of the mating container members to abut against the second peripheral enclosure of the mating container member, whereby second substantially circular peripheral enclosures and first substantially circular peripheral enclosures of adjacent container members are adapted to respectively combine to form a stack of plural nestable containers substantially sealed against intrusion of foreign matter, and outwardly extending indexing members on the mating container members adapted to engage the indexing member of an adjacent mating container members to enable indexing of multiple stacked container members.

Also disclosed is an apparatus for individually storing for easy retrieval a plurality of items in respective individual indexed nestable containers which are each substantially sealed against intrusion of foreign material into the container, the containers adapted to form a stack which resists coming apart unless and until entry of one or more containers is desired, the apparatus having a plurality of mating container members, each of the members having a substantially planar surface having a first side and a second side, a first substantially circular peripheral enclosure upstanding from the first side, a second substantially circular peripheral enclosure upstanding from the second side, the inner perimeter of the second peripheral enclosure being sufficiently larger than the outer perimeter of the first peripheral enclosure so that the second peripheral enclosure fits over and grips the first peripheral enclosure of another one of the mating container members to abut against the second peripheral enclosure of the mating container member, whereby second substantially circular peripheral enclosures and first substantially circular peripheral enclosures of adjacent container members are adapted to respectively combine to form a stack of plural nestable containers substantially sealed against intrusion of foreign matter, and outwardly extending indexing members on the mating container members adapted to engage the indexing member of an adjacent mating container members to enable indexing of multiple stacked container members.

Also disclosed is an apparatus for individually storing for easy retrieval a plurality of items in respective individual nestable containers which are each substantially sealed against intrusion of foreign material into the container, the containers adapted to form a stack which resists coming apart unless and until entry of one or more containers is desired, the apparatus having a plurality of mating container members, each of the members having a substantially planar surface having a first side and a second side, a first substantially circular peripheral enclosure upstanding from the first side, a second substantially circular peripheral enclosure upstanding from the second side, the inner perimeter of the second peripheral enclosure being sufficiently larger than the outer perimeter of the first peripheral enclosure so that the second peripheral enclosure fits over and grips the first peripheral enclosure of another one of the mating container members, whereby second substantially circular peripheral enclosures and first substantially circular peripheral enclosures of adjacent container members are adapted to respectively combine to form a stack of plural nestable containers substantially sealed against intrusion of foreign matter.

Also disclosed is an apparatus for individually storing for easy retrieval a plurality of items in respective individual nestable containers which are each substantially sealed against intrusion of foreign material into the container, the containers adapted to form a stack which resists coming apart unless and until entry of one or more containers is desired, the apparatus having a plurality of mating container members, each of the members having a substantially planar surface having a first side and a second side, a first peripheral enclosure upstanding from the first side, a second peripheral enclosure upstanding from the second side, the inner perimeter of the second peripheral enclosure being sufficiently larger than the outer perimeter of the first peripheral enclosure so that the second peripheral enclosure fits over and grips the first peripheral enclosure of another one of the mating container members, whereby second peripheral enclosures and first peripheral enclosures of adjacent container members are adapted to respectively combine to form a stack of plural nestable containers substantially sealed against intrusion of foreign matter.

Also disclosed is an apparatus for individually storing for easy retrieval a plurality of items in respective individual indexed nestable containers which are each substantially sealed against intrusion of foreign material into the container, the containers adapted to form a stack which resists coming apart unless and until entry of one or more containers is desired, the apparatus having a plurality of mating container members, each of the members having a surface having a first side and a second side, a first substantially circular peripheral enclosure upstanding from the first side, a second substantially circular peripheral enclosure upstanding from the second side, the inner perimeter of the second peripheral enclosure being sufficiently larger than the outer perimeter of the first peripheral enclosure so that the second peripheral enclosure fits over and grips the first peripheral enclosure of another one of the mating container members, whereby second substantially circular peripheral enclosures and first substantially circular peripheral enclosures of adjacent container members are adapted to respectively combine to form a stack of plural nestable containers substantially sealed against intrusion of foreign matter; outwardly extending indexing members on the mating container members adapted to engage the indexing member of an adjacent mating container members to enable indexing of multiple stacked container members; a positioning member on at least the first or second side to hold in position an optical disk within the formed nestable containers.

Also disclosed is an apparatus for individually storing for easy retrieval a plurality of items in respective individual indexed nestable containers, the containers adapted to form a stack which resists coming apart unless and until entry of one or more containers is desired, the apparatus having a plurality of mating container members, each of the members having a surface having a first side and a second side, a first substantially circular peripheral enclosure upstanding from the first side, a second substantially circular peripheral enclosure upstanding from the second side, the inner perimeter of the second peripheral enclosure being sufficiently larger than the outer perimeter of the first peripheral enclosure so that the second peripheral enclosure fits over and grips the first peripheral enclosure of another one of the mating container members, whereby second substantially circular peripheral enclosures and first substantially circular peripheral enclosures of adjacent container members are adapted to respectively combine to form a stack of plural nestable, outwardly extending indexing members on the mating container members adapted to engage the indexing member of an adjacent mating container members to enable indexing of multiple stacked container members; a positioning member on at least the first or second side to hold in position an optical disk within the nestable containers, formed by adjacent mating container members.

BRIEF DESCRIPTION OF THE DRAWINGS

FIG. 7 depicts one embodiment of the bottom section looking into the container cavity.

FIG. 8 illustrates one embodiment of the center container first member, second member, first bead and second bead, which holds items stored therein.

FIG. 12 shows a top view of one embodiment of a center container.

DETAILED DESCRIPTION OF THE PREFERRED EMBODIMENT

Figure 1A:
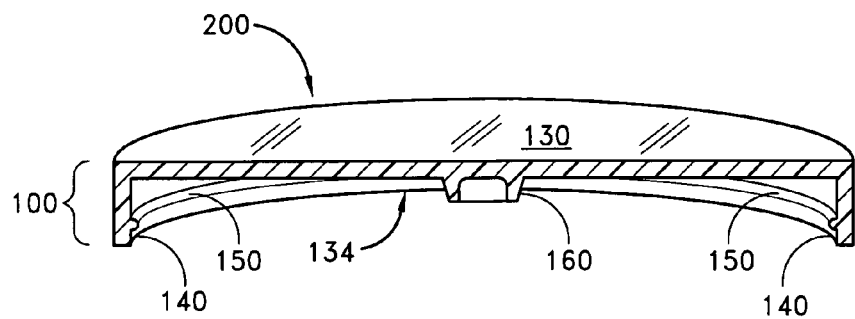
FIGS. 1A–1D depicts one embodiment of a cross section of a container stack, including a top lid, two center containers, and a bottom container.
Figure 1B:
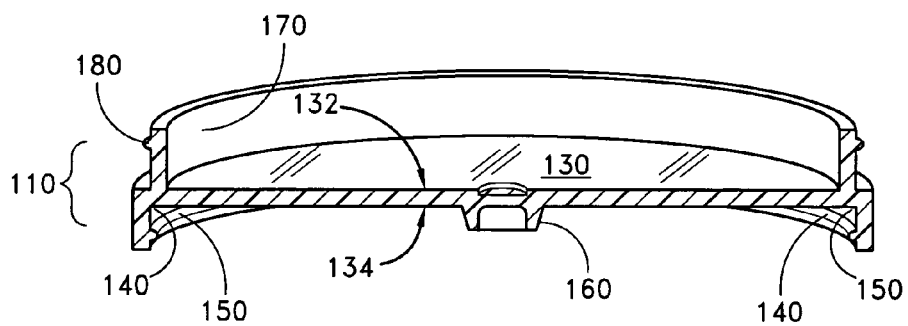
Figure 1C:
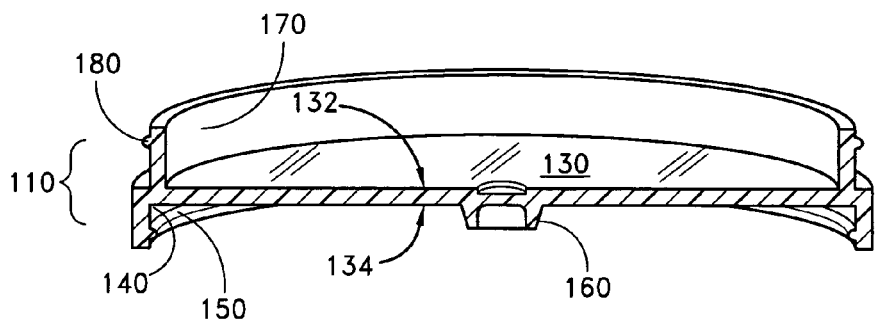
Figure 1D:
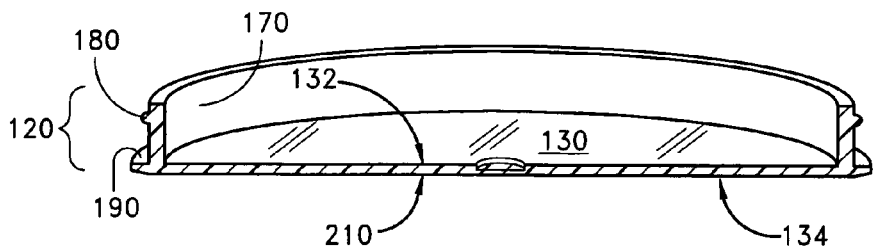
Figure 1E:
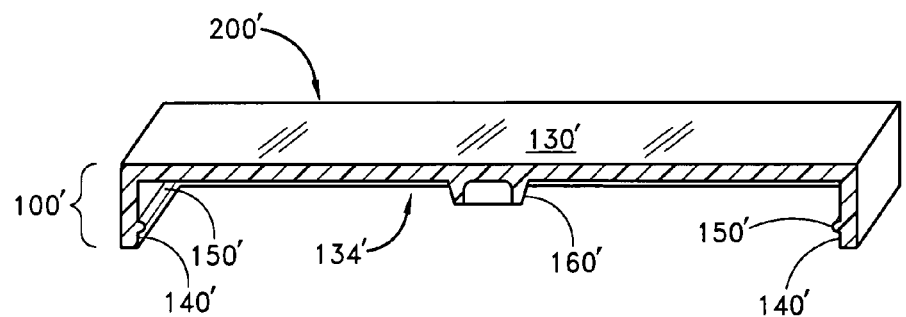
FIGS. 1E–1H depict cross-section of another embodiment of a container stack.
Figure 1F:
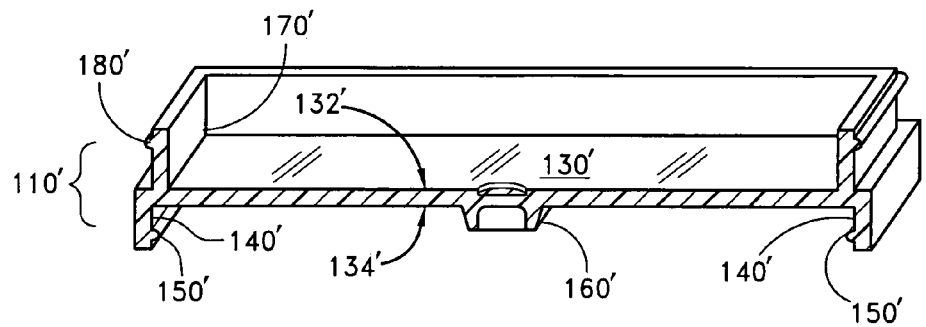
Figure 1G:
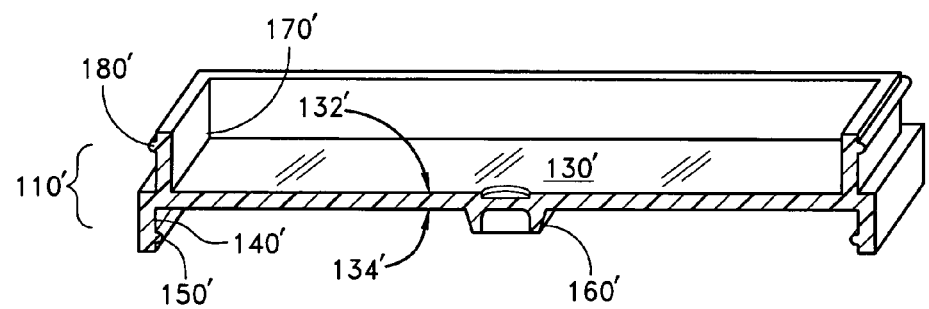
Figure 1H:
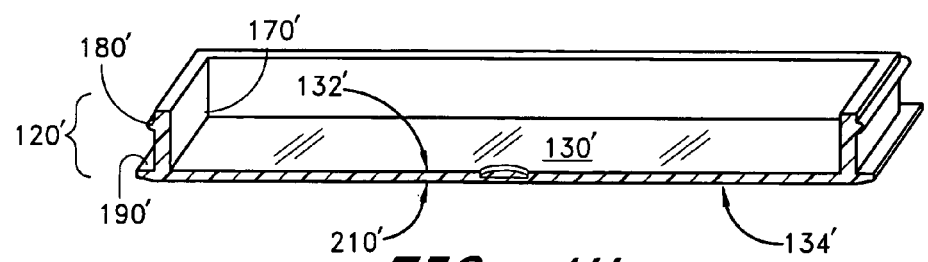

FIG. 1 depicts one embodiment of a cross section of a container stack, including a top lid 100, two center containers 110, and a bottom container 120. The center containers 110 each include a generally planar surface 130, where the planar surface is substantially flat and typically of a size slightly larger than the shape of the items to be held in the container stack. Thus, if the container stack is to hold compact disks (CDs), the planar surface will have a width of at least the diameter of a CD (approximately 4.75 inches) and preferably will be a circular disc with a diameter slightly greater than the CD diameter or a rectangle with sides of the same dimension (See FIGS. 1E–1H, wherein similar components to those in FIGS. 1A–1D have the same reference numeral, except that a "'" has been added to the reference numerals). The generally planar surface 130 typically has a first side 134 and a second side 132. The first side 134 is also generally flat, and contains a first member 140 which is generally normal to the first side. Advantageously, the first member 140 typically follows at or near the perimeter of the generally planar surface 130, and typically has a height slightly greater than the height of the items to be held in the container. Thus, if the container stack is to hold CDs, a height of, for example, about 0.100 inches can be advantageously used. Similarly, the second side 132 is generally flat, and contains a second member 170 which is normal to the second side. The second member 170 typically follows at or near the perimeter of the generally planar surface 130, but with a diameter or perimeter advantageously slightly greater than the diameter or perimeter of the first member 140. It is noted that the second member 170 may alternatively have a diameter or perimeter slightly smaller than the first member 140. Also, the second member 170 and/or first member 140 may include a double wall design where two parts of one or both members fits snugly with the corresponding part(s) of the other member.

Preferably, in one embodiment, the first member 140 forms a continuous ring near the perimeter of the first side 134 of the planar surface 130, where the shape of the ring varies based on the shape of the planar surface 130 and items to be stored therein, and the second member 170 similarly forms a continuous ring near the perimeter of the second side 132 of the planar surface 130. Advantageously, for example, the second member 170 creates a ring slightly larger than the ring created by the first member 140, such that a first container 110 and a second container 110 can be releasably stacked by coupling of the first member 140 of the first container to the second member 170 of the second container. One skilled in the art will understand that other shapes in addition to rings may be used in accordance with various embodiments of the current invention, and the shape of the first member 140 and second member 170 will vary based on the shape of the planar surface 130 and items to be stored in the container 110.

In several of the preferred embodiments, the releasable attachment of multiple containers is further aided by the addition of a first bead 150 placed along the outer edge of the first member 140. Some embodiments such as those depicted in FIG. 1 include a second bead 180 placed along the outer edge of the second member 170. In other preferred embodiments, only one bead 180 is found on the second member 170. Embodiments with no beads are also envisioned. In some embodiments, a bead 150 on the first member 140 may match an indented ridge on the second member. In many embodiments, one of either the first or second member will include a bead 150 with the other member having an orientation in which it is angled with respect to the planar surface 130, as shown in FIG. 10. FIG. 12 shows another preferred embodiment in which the second member 170 has an angled surface that corresponds to an internally angled first member 140.

While it is not necessary, the first bead 150 and second bead 180 preferably run continuously along the surface of the first member 140 and second member 170 respectively. Upon coupling of the first member 140 of a first container to the second member 170 a seal is created against the external environment which advantageously protects the items stored therein from dirt, pollutants, liquids, and the like. In other embodiments, an o-ring may be used to aid in the sealing of the container.

In a one embodiment of the present invention, a positioning ring 160 is included in the center of the second side 132 of the generally planar surface 130 of the container. The raised positioning ring 160 typically has a diameter ranging from about 0.200 inches to 0.600 inches and a height ranging from about 0.010 inches to 0.300 inches. This positioning ring 160 holds and centers the item stored in the container, such as for example, a CD, in the cavity formed by a junction of the first member 140 of a first container and a second member 170 of a second container. The inside hole of an optical disk, like a CD or DVD, or any similar item to be stored, has an interference fit with an outside drafted, radiused, or tapered diameter of the positioning ring 160. The contents, including, but not limited to optical disks such as CDs, CD-Rs, CD-RWs, DVDs, Laser Disks, mini CDs, and mini DVDs, can be held away from the first side 134 by the draft angle or taper on the outside diameter of the ring 160. By holding the contents in position, this ring 160 can help prevent the contents from rubbing on the inside surfaces of the container. While it is not a necessary feature of the disclosed invention, in some embodiments, an item to be stored is in contact with only contact positioning ring 160. FIG. 12 shows another feature of some embodiments in which a positioning ring 160 is included on both sides of a center container 110. In some of the embodiments exhibiting this feature an optical disk or other item touches only the top and bottom positioning rings 160. Some of the embodiments depicted in FIG. 12 prevent movement of an optical disk or other item as it is held in a closed container. Additionally, FIG. 12 shows an stabilizing rib 162 that helps secure the outer edges of an optical disc. Some embodiments include more than one stabilizing rib 162 and some embodiments include stabilizing ribs on the first sides 134 and the second sides 132.

In addition to, or instead of, the positioning ring 160 on the first side 134, a raised positioning ring 160 can be placed on the second side 132 as shown in FIG. 12. Other embodiments have a positioning ring 160 on both sides.

In another preferred embodiment, the combined height of any combination of positioning rings 160 does not exceed the height of the cavity formed by a junction between two center containers 110, between a center container 110 and a top lid 100, and/or between a center container 110 and a bottom container 120.

Figure 2:
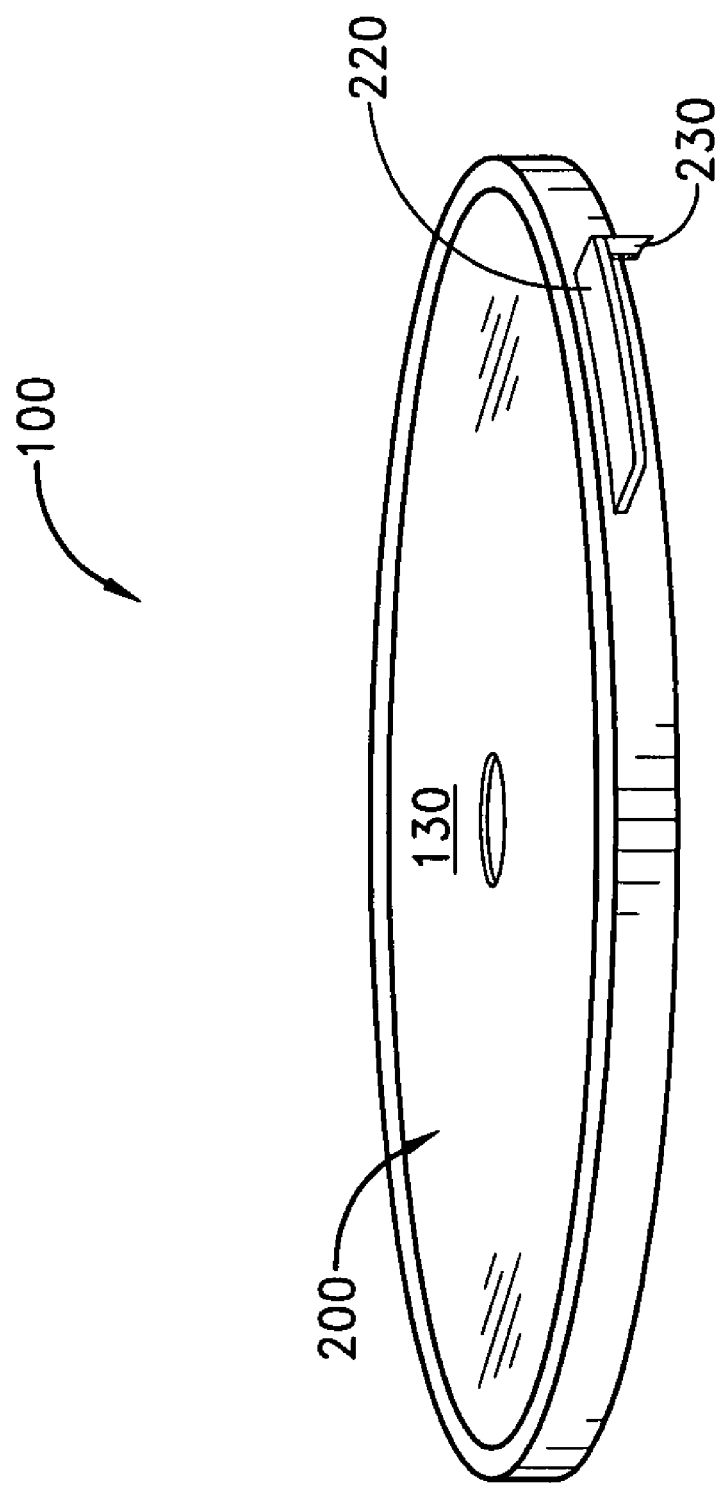
FIG. 2 shows one embodiment of the top lid of the container stack, where typically only one top lid is used per stack.
Figure 3:
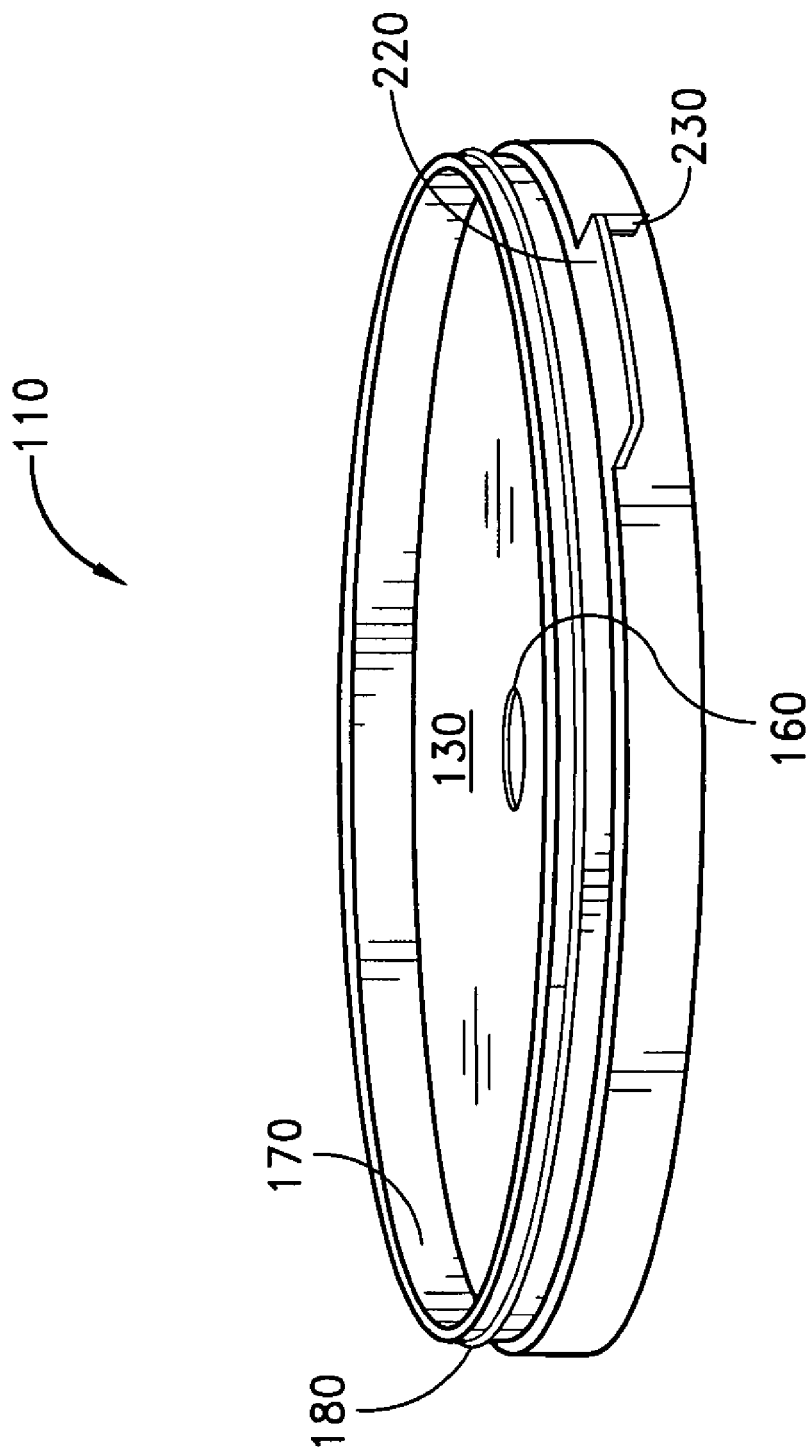
FIG. 3 depicts one embodiment of a center container, where the center container forms the container section on top and the lid of the next container on the bottom.
Figure 11:
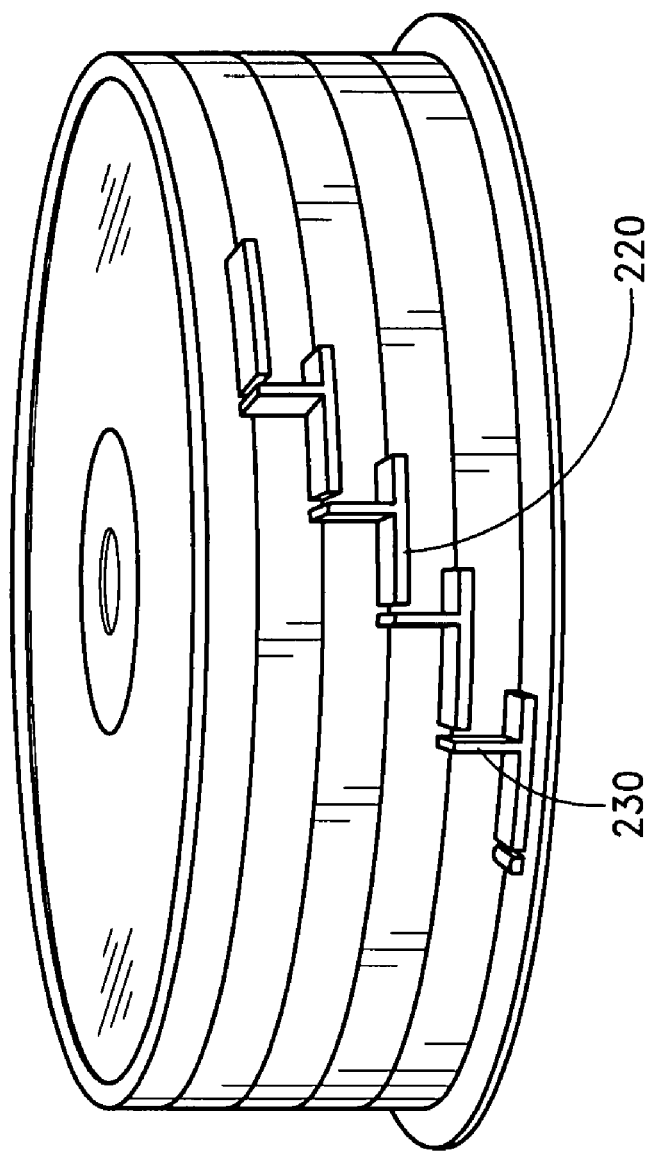
FIG. 11 illustrates one embodiment of a container stack where center containers are aligned with their tabs in a spiral fashion.

FIGS. 2 and 3 depicts other embodiments in which the containers include a tab 220 and tang 230. The tab 220 typically extends from the generally planar surface 130 and aides in prying open a first container and a second container to retrieve the item contained therein. For some embodiments, on one edge of the tab 220 advantageously is included a tang 230. The tang 230 permits the tab 220 for each center container 110 as well as the top container 100 to easily be aligned to permit simple indexing of the tabs 220 for various items stored in the container(s). Alignment is achieved by rotation of each level of the stacked containers such that the tang 230 of one level contacts the tab 220 of an adjacent level, thereby limiting the rotation of the tang 230. In several embodiments, this alignment affords a spiral arrangement as shown in FIG. 11 where all or some of the tabs 220 can be seen from an overhead view or an angled view. Advantageously, in one embodiment, depicted in FIG. 4, the bottom lid 120 also includes a bottom tab 190. The bottom tab 190 in one embodiment is an ordinary tab 220, but in a preferred embodiment is an extension of the generally planar surface 130 of the bottom lid 120 that extends around the entire perimeter of the bottom lid 120. In other embodiments, the bottom tab 190 may be a button or a bump or a tang or a similar feature that limits the rotation of a tang on an adjacent center container 110.

Another feature of many embodiments includes a tang 230 on the tab 220 that allows for the tabs 220 to be offset rotationally at each level. This creates a spiral column of tabs 220 as shown in FIG. 11. Labels including data or indicia can be included on the tabs 220 and can be quickly and easily referenced with the tabs 220 spiraled. In one embodiment shown in FIG. 4, the bottom male container has a tab 220 that runs around the entire outside diameter except for an area of about 0.200 inches. This gap 240 is where the tang 230 from an adjacent center container 110 is positioned for proper closing. Each tang 230 hangs below the bottom of the center container 110 to which it is attached by about 0.070 inches and stops the tab 220 of the container below from overlapping the tab 220 connected to the tang 230. This tang/tab combination makes a mechanical stop. In some embodiments, each tang 230 has a gap ranging from about 0.040 inches to 0.050 inches, so that the bottom of the tang 230 does not come into contact with adjacent container.

In some preferred embodiments of the current invention, tabs 220 and tangs 230 are used for indexing. Each container has a marking on a tab 220. In some embodiments, the top lid 100 has a raised rib 260 around the outer diameter as seen in FIG. 2. The rib 260 is on the flat surface 130 and ranges from about 0.010 inches to 0.050 inches in height. This allows for a label or other indicia on the top lid 100 and protects such a label from scratches or smears that may occur if the flat surface 130 were allowed to touch other surfaces, such as a tabletop, as would be the case without the rib. The label can include any number of indicia that correspond to the tabs 220 so as to indicate the contents associated with each tab 220. In some embodiments, a user can change the indicia as the contents are changed. The tangs 230 located on the outside diameter wall can have an attached tab 220, which also will have a flat surface for some type of indicia. The tab 220 of the invention can be larger if a larger label is needed for more information. For some embodiments, the tab size for the invention is about 2 inches in length, but preferably about 1.2 inches.

FIG. 8 illustrates one embodiment of the center container 110 first member 140, second member 170, first bead 150 and second bead 180, which holds items stored therein. In some preferred embodiments, the current invention is especially advantageous because it seals out dirt, moisture and the outside environment. It is foreseen that the size of the first bead 150 and second bead 180 and other aspects of the first member 140 and second member 170 may be adjusted to make the seal between a first container and a second container "tight" in order to prevent inadvertent opening, or "loose" to allow ease of opening.

In several embodiments, the current invention has an opening function which allows the user to pry apart two tabs 220 with both thumbs. The smallest hands to the largest hands are capable of doing this. In various aspects, this invention allows easy retrieval of the desired container with the use of a tab 220 molded on each center container 110.

In several embodiments of the current invention, the container is used for holding, organizing or securing optical discs such as CDs, DVDs, mini CDs, mini DVDs, and floppy discs. One skilled in the art will understand that the containers of the present invention may be used for any object that can fit into the cavity formed by a male/female junction of a first member 140 and a second member 170.

Figure 5:
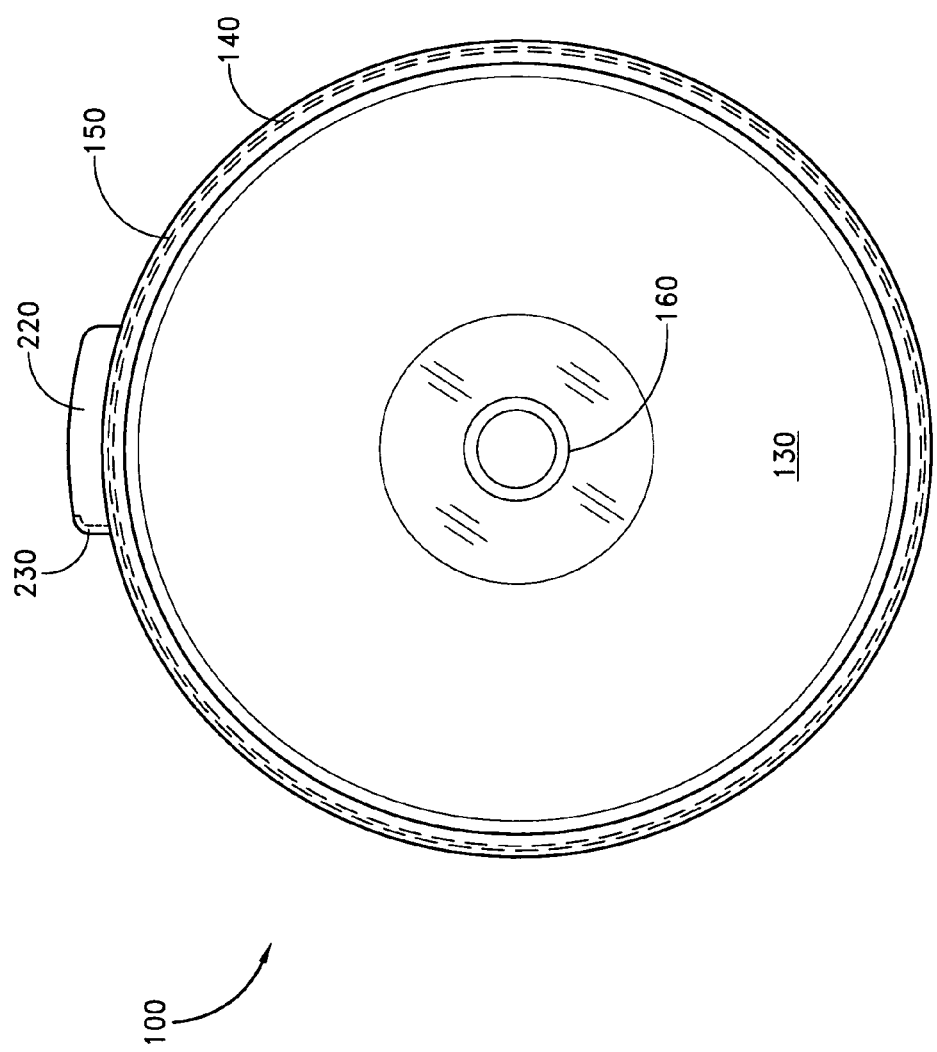
FIG. 5 is a top view of a top container.
Figure 6:
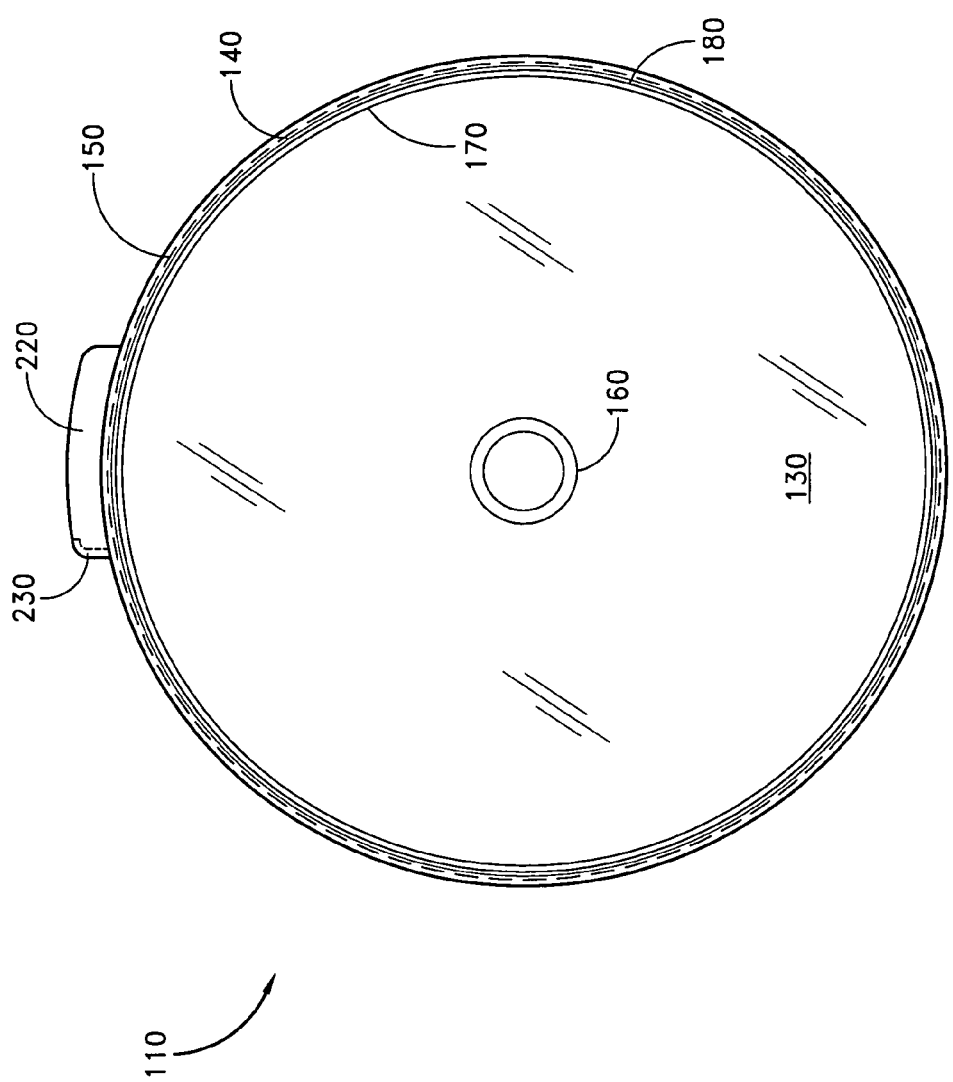
FIG. 6 is a top view of one embodiment of a center container.
Figure 9A:
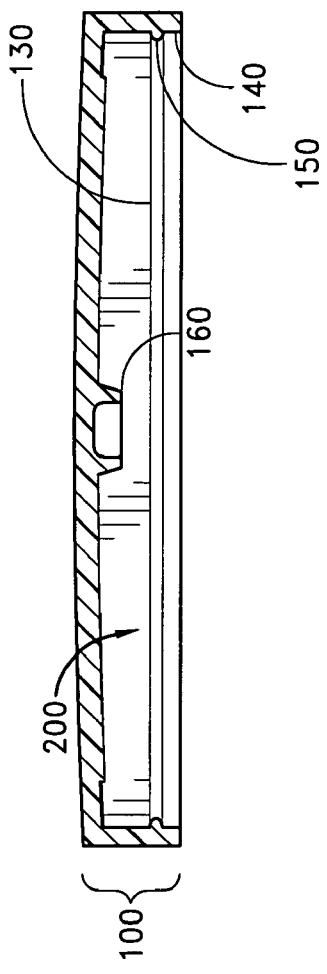
FIG. 9 shows one embodiment of a container stack, including a top lid and a bottom container.
Figure 9B:
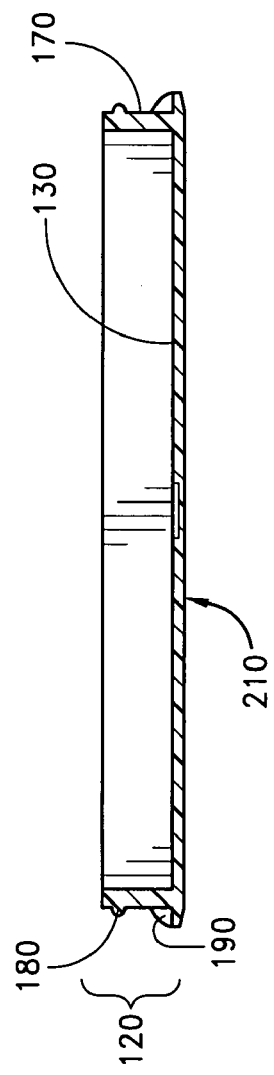
Figure 10A:
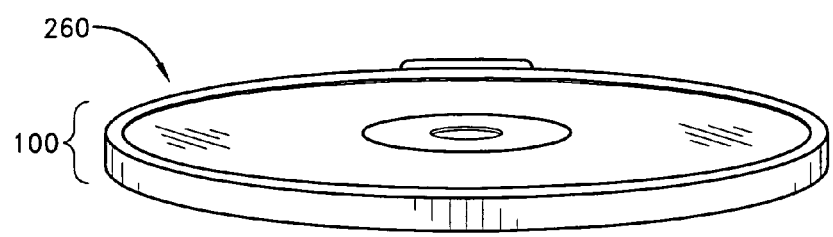
FIG. 10 shows one embodiment of a container stack, including a labeled top lid, a center container, and a bottom container.
Figure 10B:
Figure 10C:
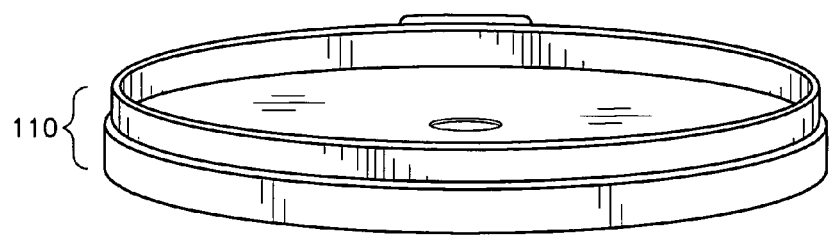
Figure 10D:
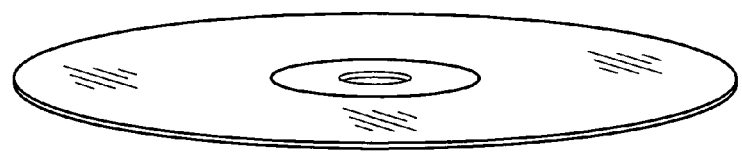
Figure 10E:
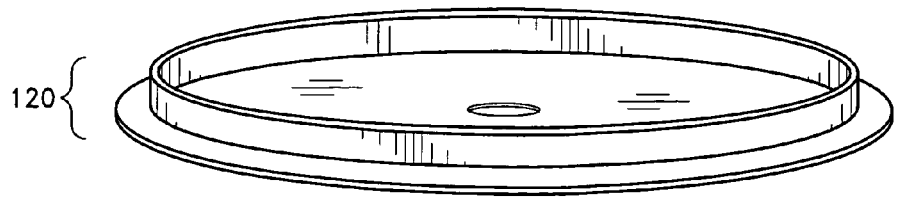

FIG. 2 shows one embodiment of the top lid of the container stack, where typically only one top lid is used per stack. FIG. 5 illustrates one embodiment of the top container section looking down into the inside.

Figure 4:
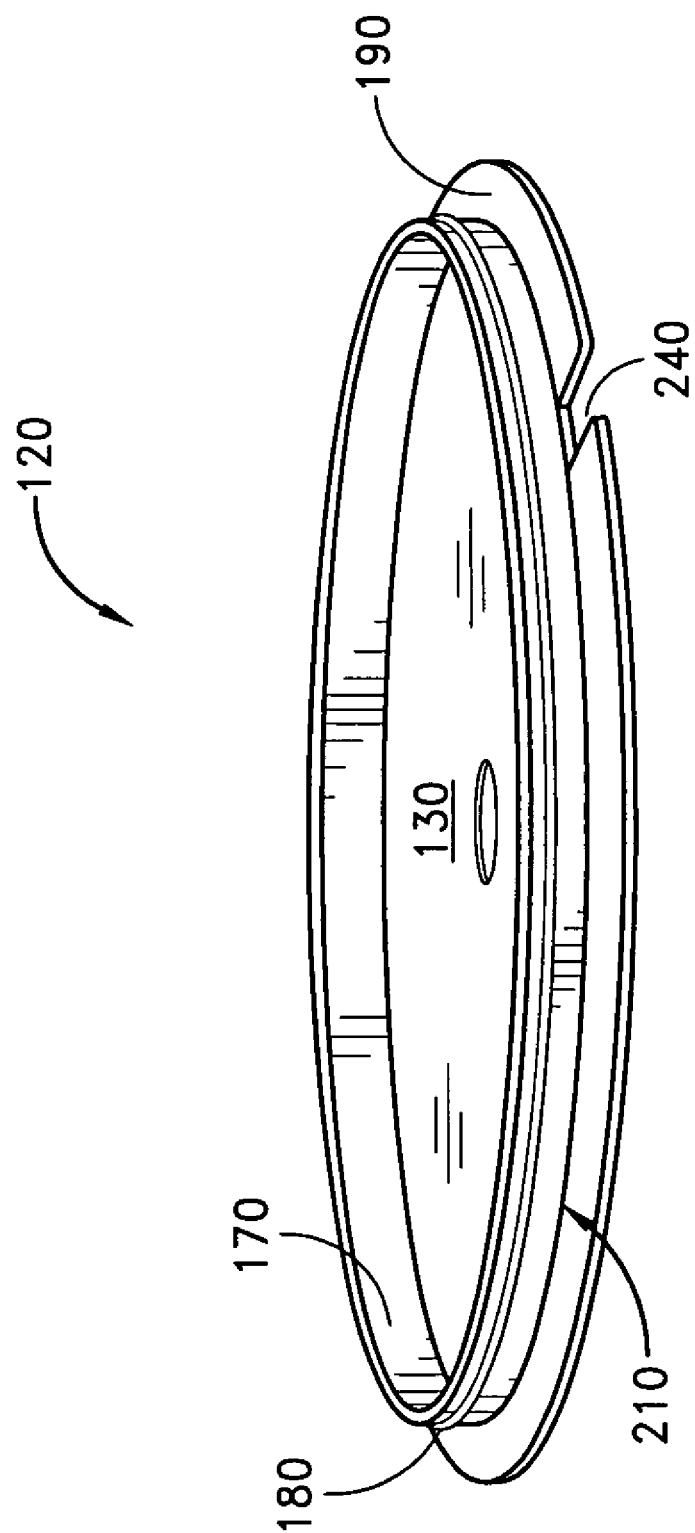
FIG. 4 illustrates one embodiment of the bottom container, which forms the base of the stack of containers.

Returning to FIG. 1, the bottom lid 120 typically includes a generally planar surface 130, and a bottom surface 210. The second side 134 of the bottom lid 120 includes a second member 170, typically including a second bead 180. The bottom surface 210 typically is left substantially flat for inclusion of secondary features such as labels, advertisements, or attachments. The use of a flat outer surface for the bottom lid 120 and top lid 100 also provide a simple placement position for the container from which the container advantageously will not roll or fall. FIG. 4 illustrates one embodiment of the bottom container, which forms the base of the stack of containers. FIG. 7 depicts one embodiment of the bottom section looking into the container cavity. In this embodiment, a bottom tab 190 extends around most of the perimeter of the bottom container 120. An optional tab 220 and tang 230 are shown as well, although either form of tab may be used with or with out the other. Advantageously, a gap 240 in the bottom tab may be included to catch the tang 230 from center containers 110 or top containers 100 placed directly above the bottom container 120.

In one aspect of the invention, the container is made from clear plastic to allow the user to view the contents in the cavity. In other embodiments, the plastic is tinted or colored with translucent or opaque color additives. In a preferred embodiment, an opaque container which filters potentially damaging UV light is used. Accordingly, the user is able to take the discs into the direct sunlight.

In some embodiments, the container is square-shaped or rectangular-shaped. (See FIGS. 1E–1H). In a preferred embodiment, the container is made of plastic that is softer than the polycarbonate plastic used in optical disks, thus preventing or minimizing any damage to the optical disk itself. In some preferred embodiments, surprising new advantages were found using polypropylene. Many plastics have been found to have a degrading effect on optical disks over time. Polypropylene was found to be non-toxic to optical disks.

Figure 13:
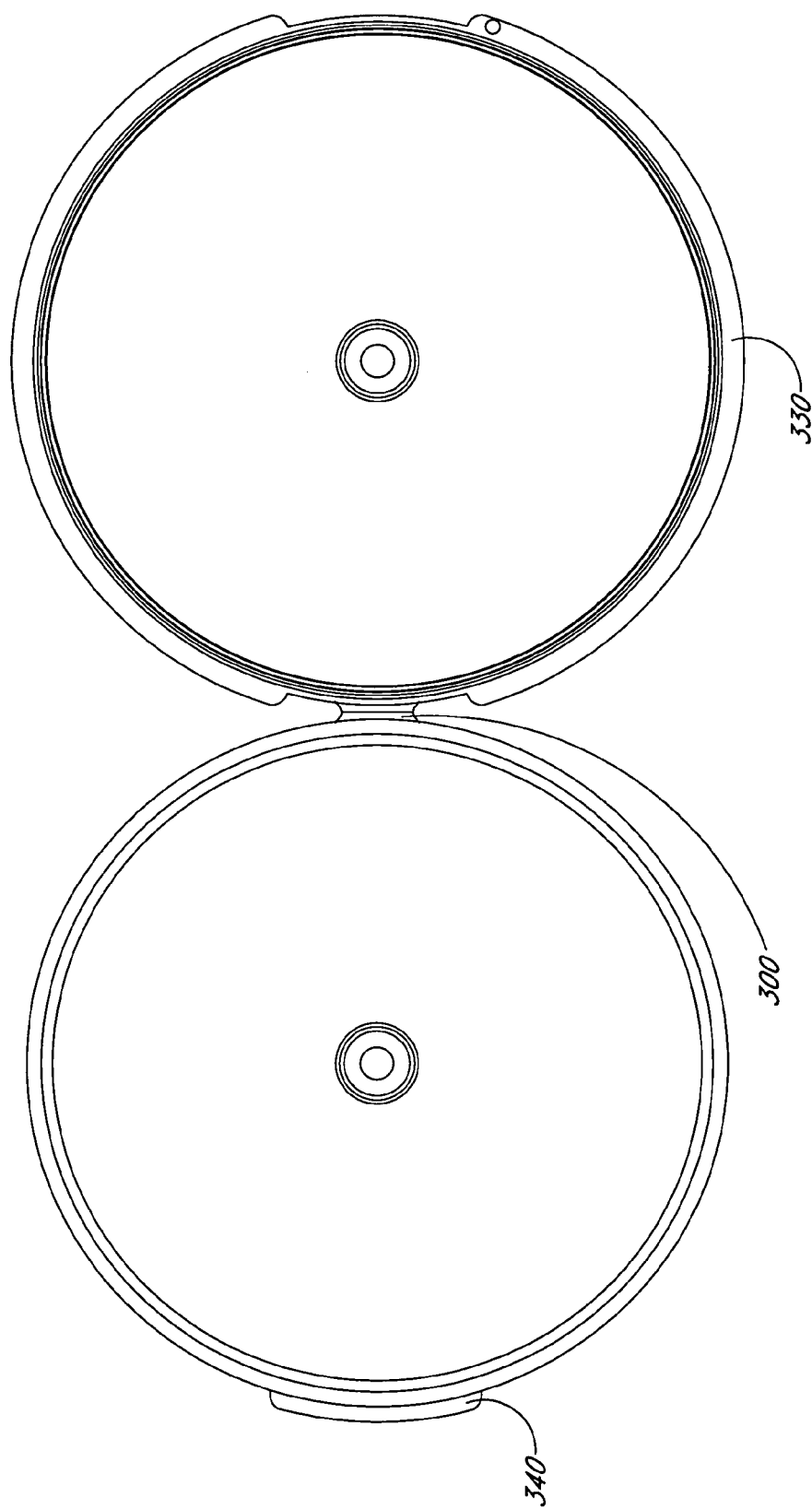
FIG. 13 shows a top view of a single disc container with featuring hinged top and bottom pieces.
Figure 14:
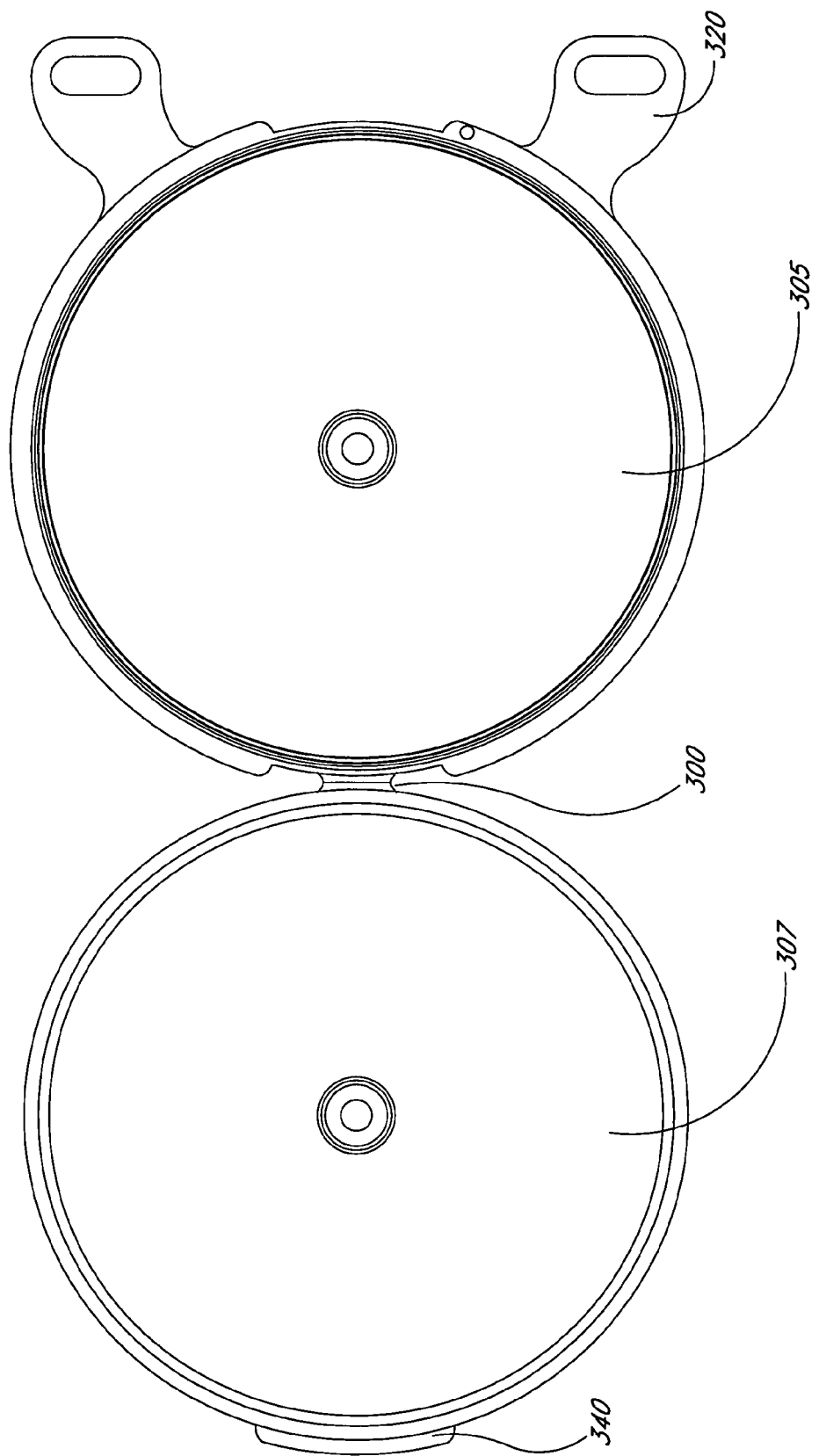
FIG. 14 shows a top view of another embodiment of a container including a hinge and ears.

FIG. 10 shows additional features of some embodiments of a container stack, including a top lid 100, a center container 110, and a bottom container 120. Some features of the embodiments represented in FIG. 10 include a container that, when sold as a commercial distribution container, includes two optical disks 250, or alternatively one optical disk 250 and one set of informational material such as a CD booklet (not shown). Advantageously, a label 260 is added to the top lid 100 and optionally the bottom lid 120 as well. Upon purchase of the commercial distribution container, the consumer can combine the top lid 100, center container(s) 110, and/or bottom container 120 with the consumer's other containers purchased in accordance with the present invention, to create a variable size Several embodiments of the present invention hold only a single optical disk or other item and may or may not be stackable. Many of these embodiments are depicted in FIG. 13. FIG. 13 shows one such embodiment where the top lid 305 is connected to the bottom lid 307 by a hinge 300. In other single container embodiments, the top lid 305 and bottom lid 307 are separable. Additional single disk container embodiments include ears 310 that allow the container to be snapped or hooked into a carrying case. For example, one feature of FIG. 13 is the ears 310 designed to be hooked into a two or three-ring binder or a day-timer. The ears 310 depicted in FIG. 13 may also be used in stackable, multi-item containers.

Another feature of many embodiments is a guard ring 330 as shown in FIGS. 12 and 13. The guard ring 330 extends laterally near or beyond the opening tab 340 and provides protection from accidental opening such as may result from dropping the container or inadvertently brushing the opening tab 340 against another surface.

The guard ring 330 also serves a function when the containers are sorted by some types of machines such as sorting devices and roller devices. For example, many post offices use rollers in various ways to process, sort, or maneuver mail and some roller devices have trouble climbing over objects that are too thick or too tall. In such situations, the guard ring 330 functions as a ramp and is helpful because it allows the roller to gradually roll over the total thickness or height by first rolling on to the relatively thin guard ring 330.

and the guard ring 330 acts as a ramp allowing the roller to first climb the height of the guard ring and then climb over the highest edge of the container.

While this invention has been particularly shown and described with references to preferred embodiments thereof, it will be understood by those skilled in the art the various changes in form and details may be made therein without departing from the scope of the invention.

What is claimed is:

1. An apparatus for stackably storing optical disks, comprising:
   a first container;
   a substantially planar surface included in the first container, said surface having a first side and a second side, the surface having a shape suited to cover at least one optical disk;
   a first member included in the first container raised from the first side of the surface, said first member having a first member perimeter;
   a second member included in the first container raised from the second side of the surface, said second member having a second member perimeter slightly larger than the first member perimeter, the second member suited to releaseably couple the first container to a first member of a substantially identical second container to form a substantial seal against intrusion of foreign matter, said first member forming a substantially complete perimeter around the first side of the surface, said second member forming a substantially complete perimeter around the second side of the surface;
   a tab extending from the surface of the first container, the tab suited to releaseably decouple the first container from the second container; and
   a tang extending from the surface of the first container, the tang suited to prevent the tab of the first container from sliding past a tab of the second container.

* * * * *

UNITED STATES PATENT AND TRADEMARK OFFICE
CERTIFICATE OF CORRECTION

| | |
|---|---|
| PATENT NO. | : 7,051,871 B2 |
| APPLICATION NO. | : 10/272158 |
| DATED | : May 30, 2006 |
| INVENTOR(S) | : Kenneth A. Loritz |

It is certified that error appears in the above-identified patent and that said Letters Patent is hereby corrected as shown below:

Title Page at page 1, column 2 (Foreign Patent Documents) Item [56], line 1, after "3/1993" please insert --GB11B 33/04--.

Title Page at page 2, column 2 (U.S. Patent Documents), Item [56], line 11, please delete "6,749,061 B1" and insert --6,749,061 B2--, therefor.

Title Page at page 2, column 2 (Foreign Patent Documents) Item [56], line 1, after "6/1992" please insert --B42D 05/04--.

At page 2, column 2, line 18, after "container" please insert --.--.

At page 2, column 7, line 63, please delete "cross-section" and insert --cross sections--, therefor.

At page 11, column 8, line 31, please delete "EMBODIMENT" and insert --EMBODIMENTS--, therefor.

At page 17, column 12, line 29, after "size" please insert --.--.

At page 18, column 12, line 59-62, please delete "330." and insert --330 and the guard ring 330 acts as a ramp allowing the roller to first climb the height of the guard ring and then climb over the highest edge of the container.-- as a continuation paragraph on line 59.

UNITED STATES PATENT AND TRADEMARK OFFICE
CERTIFICATE OF CORRECTION

PATENT NO. : 7,051,871 B2
APPLICATION NO. : 10/272158
DATED : May 30, 2006
INVENTOR(S) : Kenneth A. Loritz It is certified that error appears in the above-identified patent and that said Letters Patent is hereby corrected as shown below:

At page 18, column 12, line 65, after "art" please delete "the" and insert --that--, therefor.

Signed and Sealed this

Twenty-second Day of July, 2008

JON W. DUDAS
*Director of the United States Patent and Trademark Office*